United States Patent
Tsai et al.

(10) Patent No.: US 7,420,615 B2
(45) Date of Patent: Sep. 2, 2008

(54) PORTABLE ELECTRONIC DEVICE INCLUDING SWIVEL ACCESSORIAL MODULE

(75) Inventors: Ming-Chiang Tsai, Tu-Chen (TW); Chun-Yu Lee, Tu-Chen (TW); Tsung-Wei Chiang, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 660 days.

(21) Appl. No.: 10/921,374

(22) Filed: Aug. 18, 2004

(65) Prior Publication Data
US 2005/0063697 A1    Mar. 24, 2005

(30) Foreign Application Priority Data
Sep. 19, 2003    (TW)    ............... 92216910 U

(51) Int. Cl.
*H04N 5/225*    (2006.01)
(52) U.S. Cl. ............. 348/373; 348/333.01; 348/211.12; 348/14.1; 455/575.1
(58) Field of Classification Search ......... 348/373–375, 348/211.12, 14.01, 333.06, 333.07, 376; 455/566, 757.1
See application file for complete search history.

(56) References Cited

U.S. PATENT DOCUMENTS

| | | | | |
|---|---|---|---|---|
| 5,715,321 | A | * | 2/1998 | Andrea et al. ................. 381/92 |
| 6,741,287 | B1 | * | 5/2004 | Fuchimukai et al. ........ 348/373 |
| 7,199,554 | B2 | * | 4/2007 | Kim et al. ................... 320/114 |
| 2003/0064685 | A1 | * | 4/2003 | Kim ........................... 455/90 |
| 2005/0085273 | A1 | * | 4/2005 | Khalid et al. ............... 455/566 |

* cited by examiner

*Primary Examiner*—Lin Ye
*Assistant Examiner*—Gevell Selby
(74) *Attorney, Agent, or Firm*—Wei Te Chung

(57) ABSTRACT

A portable electronic device (10) includes a main body (20), and a pluggable module (30) rotatably attached to the main body. The main body includes a display screen (271) embedded in a front (27) thereof, and two symmetrical grooves (281) defined in opposite sides thereof. Two sockets (283) are defined in side walls of the main body that bound the grooves. Each socket includes an electrical connector electrically connecting with an inner circuit of the main body. The pluggable module includes a frame (31), a camera module (33), a headset module (32), and two tenons (3151, 3171) formed on an inside of the frame. The tenons engage in the sockets of the main body, thereby rotatably attaching the pluggable module to the main body, and electrically connecting the camera and headset modules with the inner circuit of the main body.

23 Claims, 7 Drawing Sheets

PORTABLE ELECTRONIC DEVICE INCLUDING SWIVEL ACCESSORIAL MODULE

BACKGROUND OF THE INVENTION

1. Field of the Invention

The present invention relates to portable electronic devices, and particularly to a portable electronic device which detachably includes a headset, a microphone and a digital camera module.

2. Description of Related Art

Currently, portable electronic devices are being provided with extra functions by way of plug-in modules. An example is the mobile phone model No. 7210 marketed by the Nokia Company. The mobile phone includes a Pop-Port interface, which supports a Nokia HS-1C Camera Headset that can be plugged thereinto. Referring to FIG. 7, the camera headset includes a camera module 29 and a headset module 39. The camera module 29 includes a housing 21, a cover 22, a viewfinder 23, and a lens 24. The viewfinder 23 and the lens 24 are embedded in the housing 21. The housing 21 includes a headset interface 26 on a top end thereof, a camera button 25 in a side thereof, and a Pop-Port interface connector (not labeled) on a bottom thereof. The headset module 39 is connected to the camera module 29 by the headset interface 26. A battery of the mobile phone provides power to the camera headset. When a user does not want to take photos, the cover 22 is tightly snapped over the bottom of the housing 21, and the viewfinder 23 and the lens 24 are thus hidden in the housing 21. In use of the camera module 29, the cover 22 is pulled down until the viewfinder 23 and the lens 24 are exposed. The user aims at an object to be photographed though the lens 24, previews an image of the object via the viewfinder 23, and presses the camera button 25. The image is transmitted to the mobile phone though the Pop-Port connector, and is displayed on the screen of the mobile phone.

Even though the user can preview the image of the object via the viewfinder 23, the viewfinder 23 is small, which makes it difficult to see a clear image. In addition, the user cannot preview an image of himself/herself. Moreover, wires of the camera headset are prone to get in the way of the user and become tangled.

An improved portable electronic device which includes plug-in modules and overcomes the above-described problems is desired.

SUMMARY OF THE INVENTION

Accordingly, an object of the present invention is to provide a portable electronic device that can take photos from any direction and provide a convenient preview at the same time.

A portable electronic device according to the present invention comprises a main body, and a pluggable module rotatably attached to the main body. The main body comprises a display screen and defines symmetrical grooves. The display screen is embedded in a front of the main body. The grooves are defined in opposite sides of the main body. Two sockets are defined in side walls of the main body that bound the grooves respectively. Each socket comprises an electrical connector electrically connecting with an inner circuit of the main body. The pluggable module comprises a frame and two function modules received in the frame. One of the function modules is a camera module, and the other is a headset module. The pluggable module further comprises two tenons formed on an inside of the frame. The tenons engage in the sockets of the main body, thereby rotatably attaching the pluggable module to the main body, and electrically connecting the camera and headset modules with the inner circuit of the main body.

Other objects, advantages and novel features of the invention will become more apparent from the following detailed description when taken in conjunction with the accompanying drawings, in which:

DETAILED DESCRIPTION OF THE INVENTION

Figure 1:
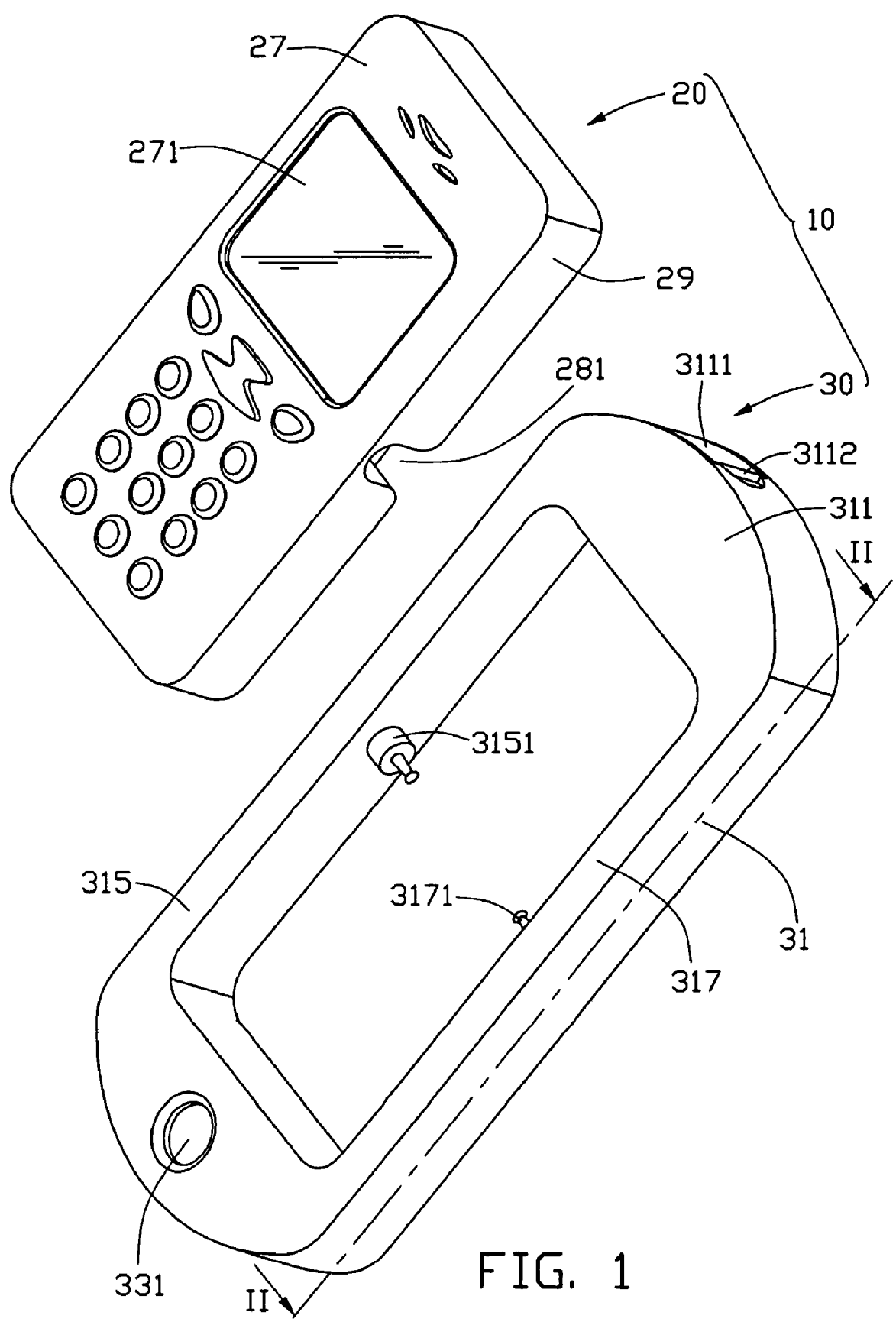
FIG. 1 is an exploded, isometric view of a portable electronic device in accordance with a preferred embodiment of the present invention, the portable electronic device comprising a main body and an accessorial module.

Referring to FIG. 1, a mobile phone 10 is used as an exemplary embodiment of the present invention. The mobile phone 10 includes a main body 20 and an accessorial module 30.

Figure 4:
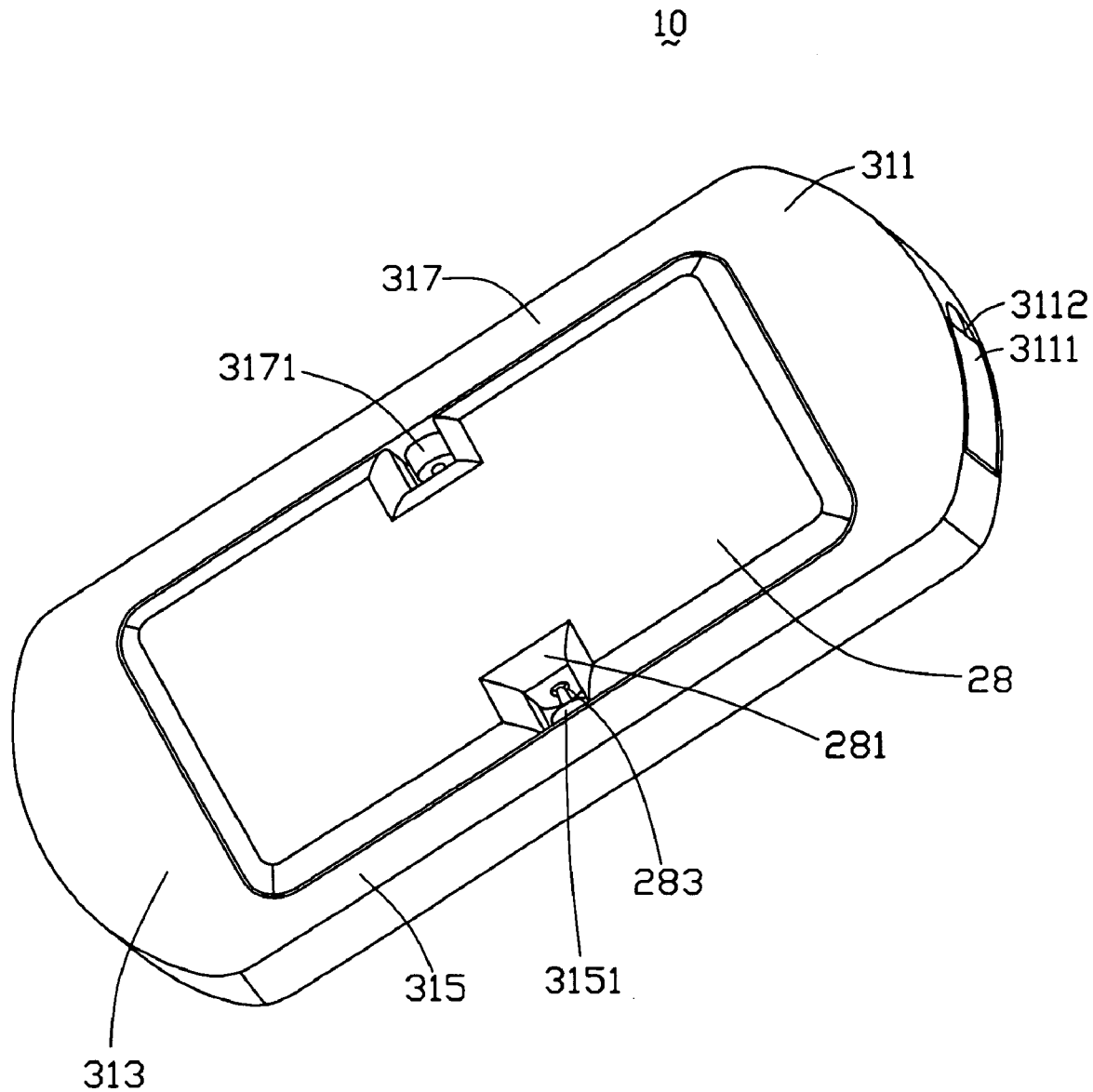
FIG. 4 is similar to FIG. 3, but viewed from a reverse aspect.

Referring also to FIG. 4, the main body 20 houses modules that provide basic functions of the mobile phone 10. Therefore, if functions provided by the accessorial module 30 are not needed, the main body 20 is freestanding and can be used independently. The main body 20 includes a display screen 271 on a front 27 thereof, two grooves 281 in a rear 28 thereof, two sockets 283 respectively in two side walls of the main body 20 that bound the grooves 281, and two electrical connectors in the sockets 283 respectively, the electrical connectors connecting with an inner circuit of the main body 20. Each groove 281 is flared on three sides thereof. Each socket 283 is flared at an entrance thereof. Said flarings facilitate easy attachment and detachment of the accessorial module 30 to and from the main body 20.

Figure 2:
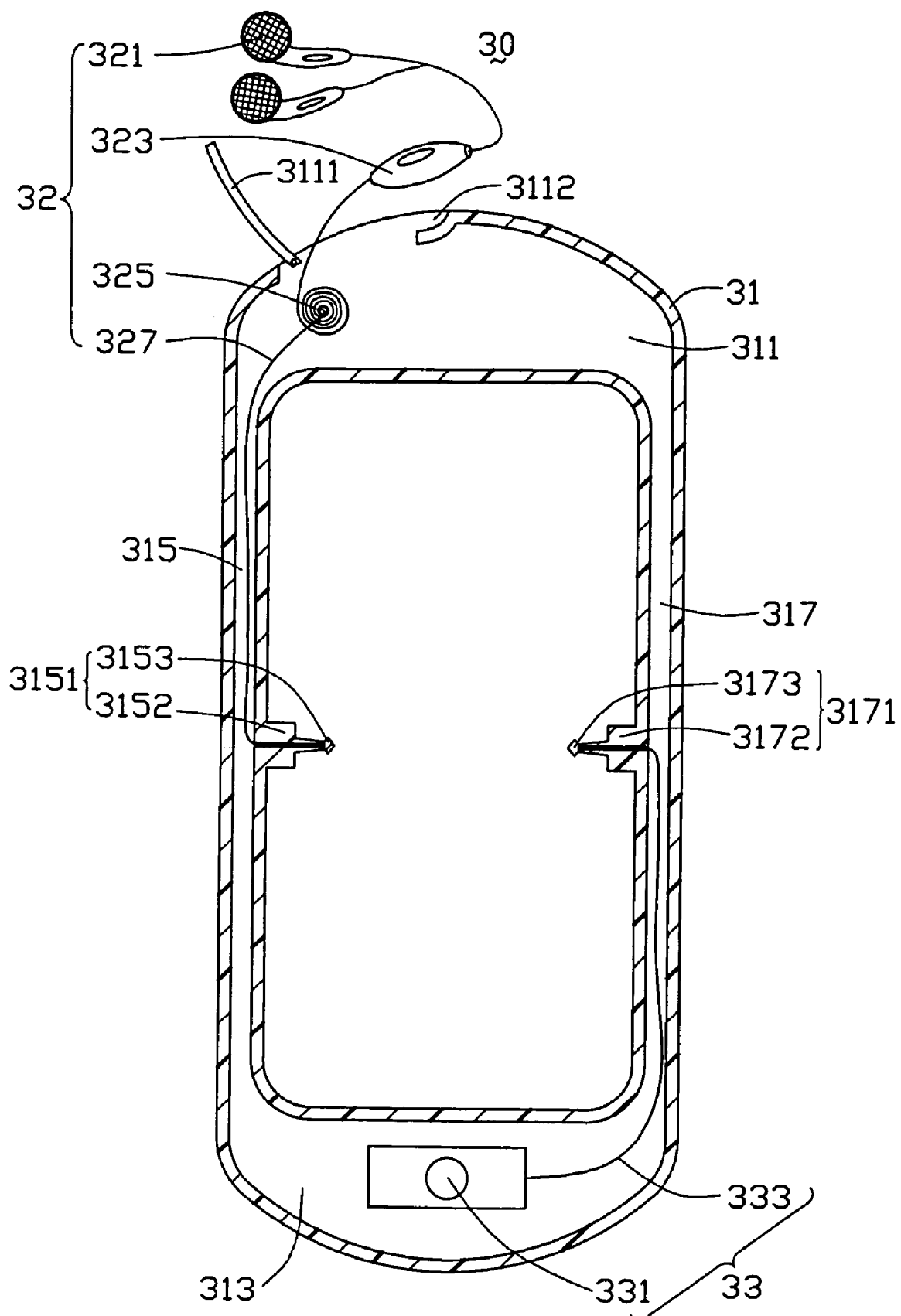
FIG. 2 is an exploded, substantially cross-sectional view of the accessorial module of the portable electronic device of FIG. 1, corresponding to line II-II thereof.
Figure 3:
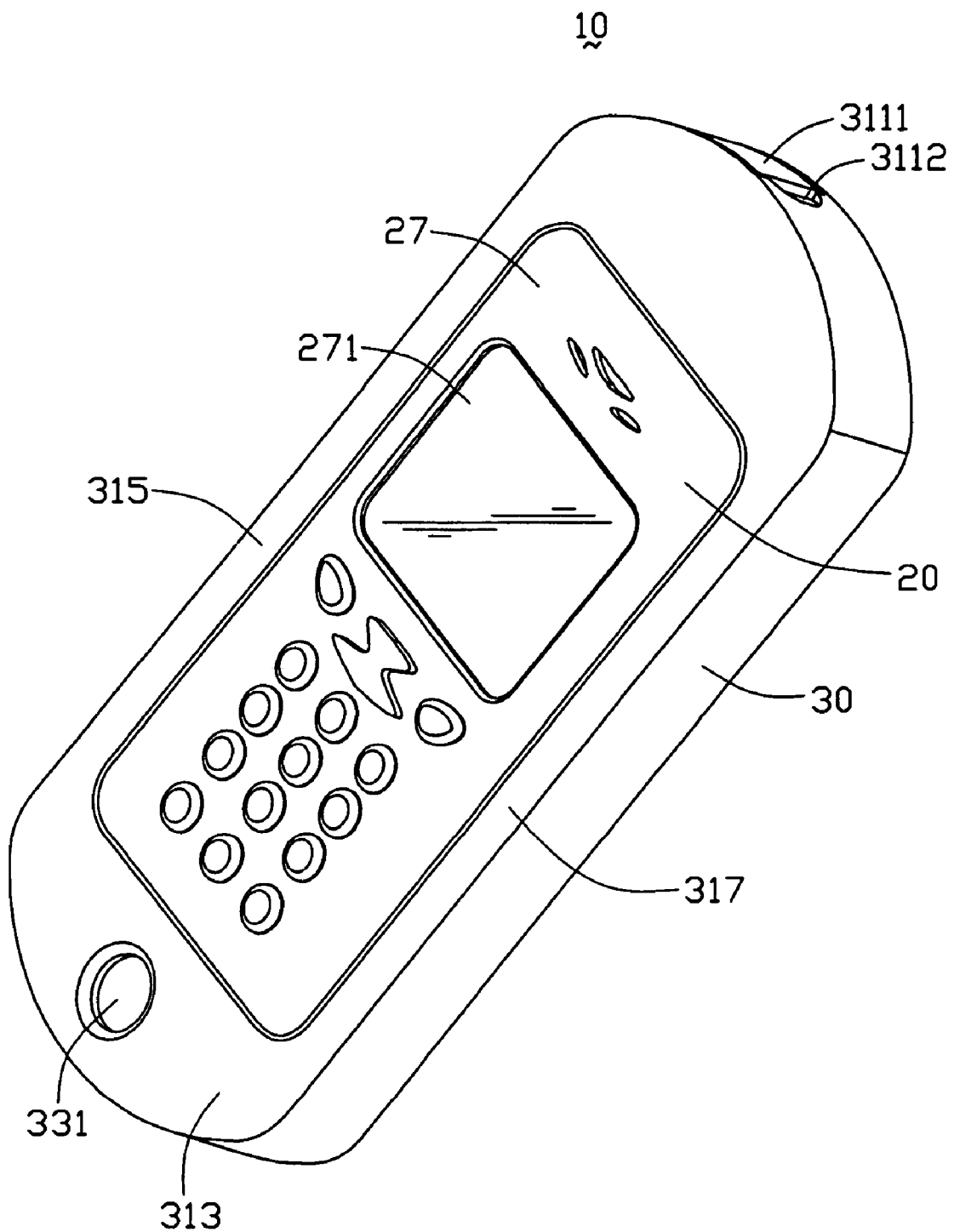
FIG. 3 is an assembled view of the portable electronic device of FIG. 1, showing the accessorial module in a first position relative to the main body.

Referring also to FIGS. 2 and 3, the accessorial module 30 is generally rectangular, and includes a frame 31, a top side 311, a bottom side 313, and left and right sides 315, 317. The four sides 311, 313, 315, 317 cooperatively define a through-space therebetween to receive the main body 20. A headset module 32 and a camera module 33 are contained in the accessorial module 30. The headset module 32 is set in the top side 311, and the camera module 33 is set in the bottom side 313. Two tenons 3151, 3171 extend inwardly from middle portions of the left and right sides 315, 317 respectively and toward each other. Each tenon 3151, 3171 respectively includes a cylindrical base 3152, 3172, and a pin 3153, 3173 extending inwardly from the base 3152, 3172. A free end of each pin 3153, 3173 is approximately hemispherical. The pins 3153, 3173 are for engaging in the sockets 283 of the main body 20.

The headset module 32 includes a headset 321, a microphone 323, a coiled spring 325, and a wire 327. The coiled spring 325 is set inside the top side 311 of the accessorial module 30. The camera module 33 is connected to the tenon 3171 by a wire 333. Part of the wire 327 connects the headset 321 and the microphone 323. Another part of the wire 327 extends from the microphone 323, wraps around the coiled spring 325, and then connects to the tenon 3151. The frame 31 includes a hinged dustproof cover 3111 covering an opening (not labeled) defined in a top wall (not labeled) of the top side 311. A cutout 3112 is also defined in the top wall of the top side 311, adjacent and in communication with the opening. A user can put his/her finger into the cutout 3112 in order to open the dustproof cover 3111, and then pull the headset 321 and the microphone 323 out from the top side 311. In this process, the coiled spring 325 is pulled and accumulates some potential energy. If the user releases the headset 321 and the microphone 323, the coiled spring 325 rebounds to its original state, and pulls the headset 321 and the microphone 323 back into the top side 311.

The camera module 33 includes a lens 331 retained in an aperture (not labeled) of a front wall of the bottom side 313, and a wire 333. One end of the wire 333 is connected to the camera module 33, and the other end is connected to the tenon 3171.

Referring to FIGS. 2, 3 and 4, in assembly, the main body 20 is set in the accessorial module 30, with the tenons 3151, 3171 being received in the grooves 281 via said smooth curved surfaces of the main body 20. In this process, the pins 3153, 3173 elastically deform the left and right sides 315, 317 of the frame 31. Once the pins 3153, 3173 snap into the sockets 283, the left and right sides 315, 317 rebound to their original shapes. The wires 327, 333 are thus connected to the inner circuit of the main body 20 by the pins 3153, 3173 respectively, so that electrical signals from the microphone 323 and the camera module 33 can be transmitted to the inner circuit of the main body 20 for processing, and voice signals can be transmitted to the headset 321. Additionally, the main body 20 and accessorial module 30 can be rotated relative to each other about an axis defined by the tenons 3151, 3171. The range of angles of rotation is unlimited.

To use the telephone function of the mobile phone 10, the dustproof cover 3111 of the top side 311 is opened, the headset 321 and the microphone 323 are pulled out, the headset 321 is worn on the user's ears, and the microphone 323 drops down to be opposite the user's mouth. When finished, the headset 321 and the microphone 323 are released and drawn into the top side 311 by force of the coiled spring 325. Then the dustproof cover 3111 is closed.

Figure 5:
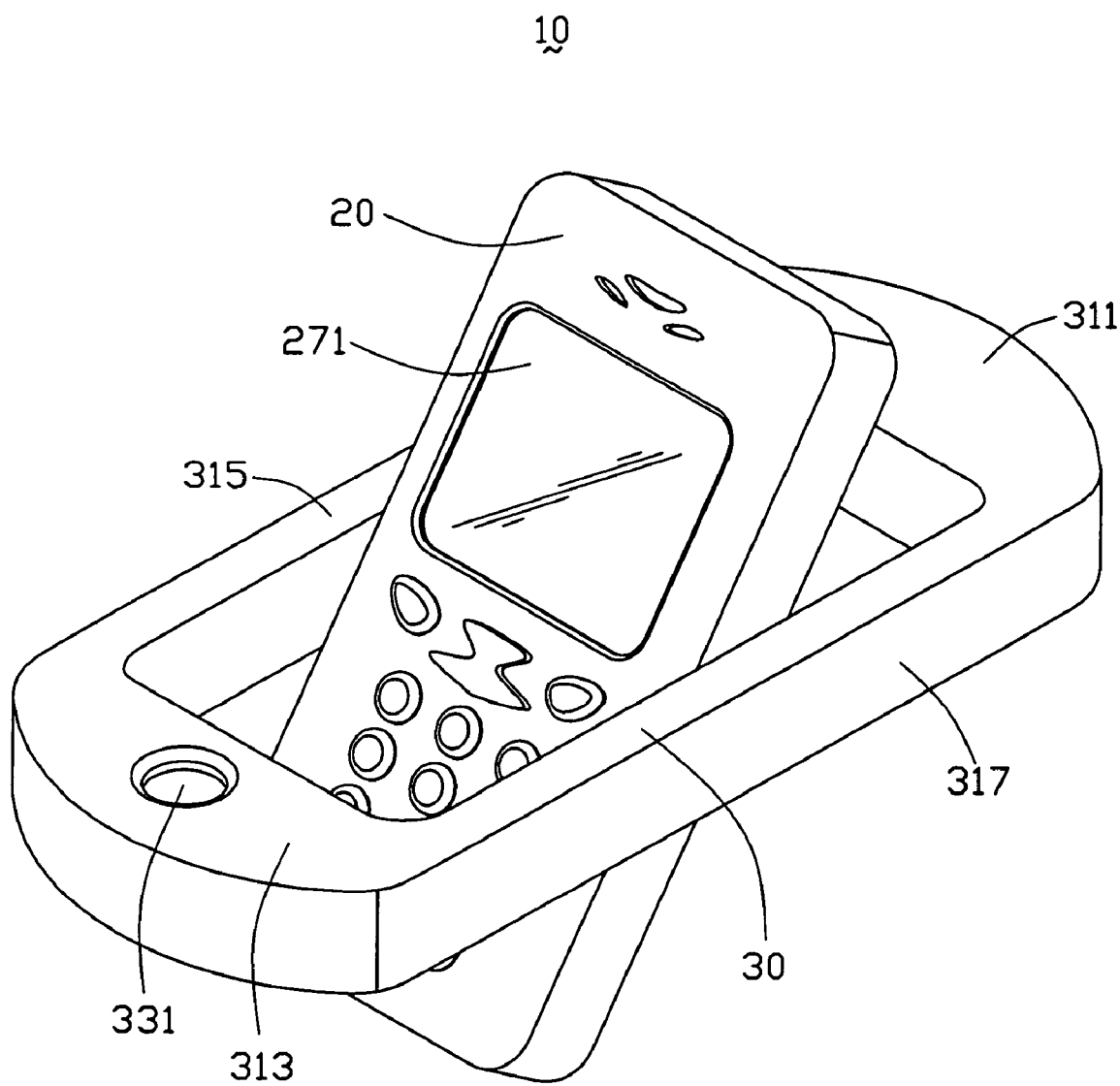
FIG. 5 is similar to FIG. 3, but showing the accessorial module rotated relative to the main body.
Figure 6:
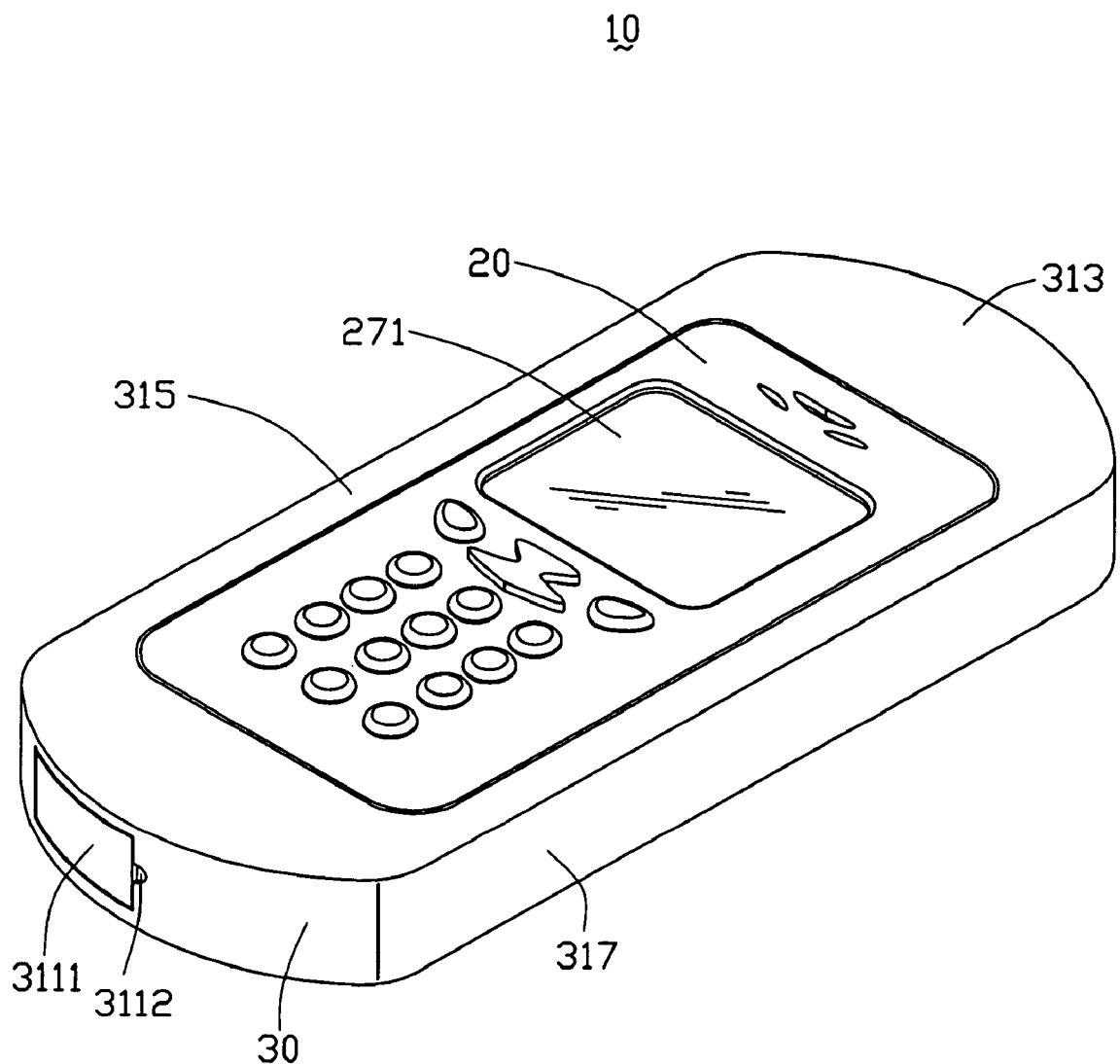
FIG. 6 is similar to FIG. 3, but showing the accessorial module rotated 180 degrees from the first position to be in a second position relative to the main body.
Figure 7:
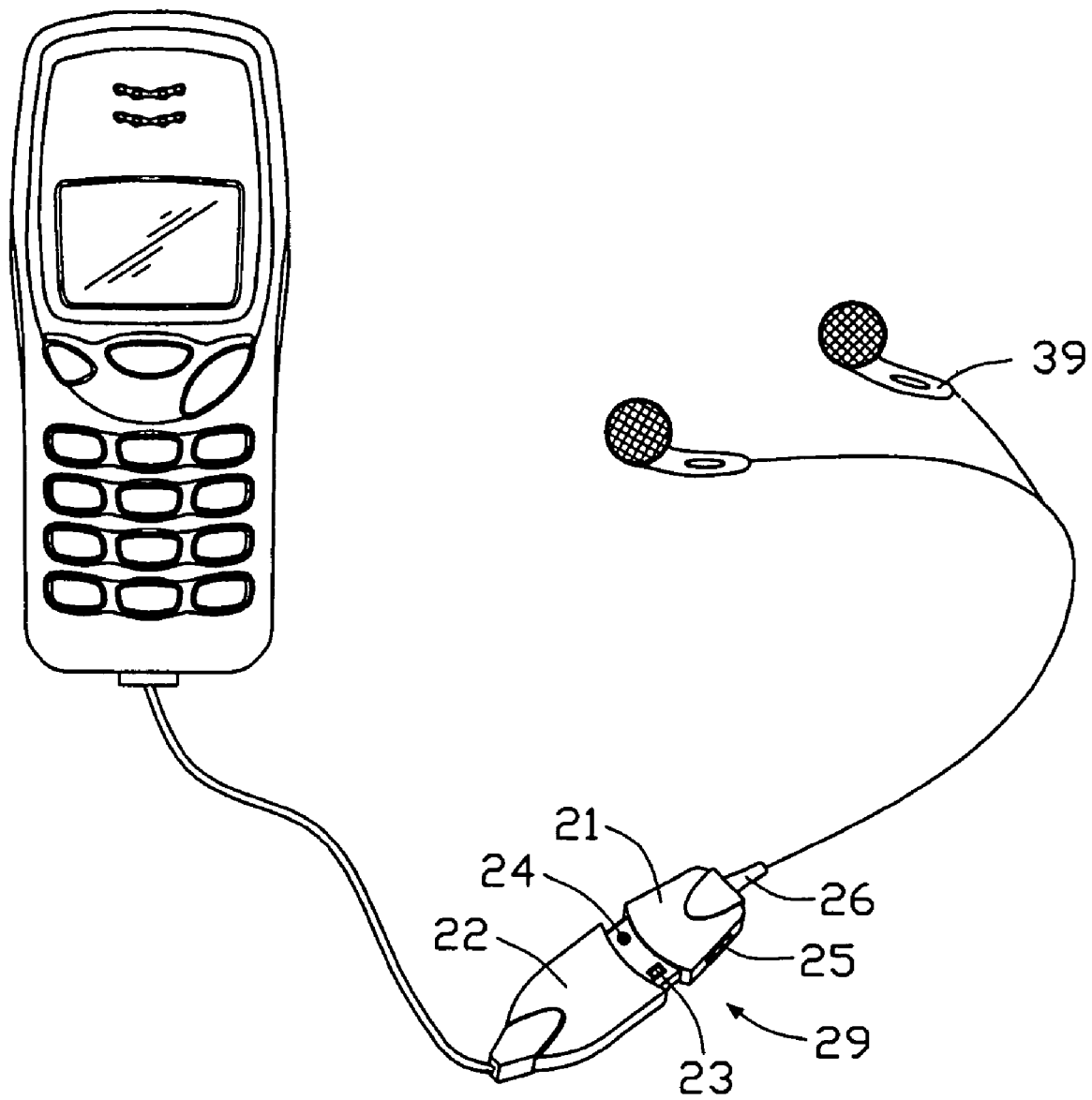
FIG. 7 is an isometric view of a portable electronic device with a plug-in camera headset of the prior art.

Referring to FIGS. 2, 5 and 6, to take a photo, the lens 331 is aimed at the object of the photo. The accessorial module 30 is held in this position, and the main body 20 is rotated until the object can be conveniently previewed by the user on the display screen 271. Any object can be conveniently previewed, because the main body 20 and accessorial module 30 can be rotated relative to each other through an unlimited range of angles.

The main body 20 can be used independently, by taking off the accessorial module 30. To separate the main body 20 and the accessorial module 30, the rear 28 of the main body 20 and the frame 31 are pushed in opposite directions at the same time. The pins 3153, 3173 are released from the sockets 283, with the free ends of the pins 3153, 3173 slipping out of the grooves 281 along said side walls of the main body 20 that bound the grooves 281.

In summary, the unique advantage of the portable electronic device of the present invention is that it can take photos from any direction and provide a convenient preview at the same time.

Although the present invention has been described with specific terms, it should be noted that the described embodiment is not necessarily exclusive, and that various changes and modifications may be made thereto without departing from the scope of the present invention as defined in the appended claims.

We claim:

1. A portable electronic device, comprising:
    a main body comprising a display screen and two sockets therein, the display screen disposed at a main surface of the main body, the two sockets located on opposite sides of the main body respectively; and
    a pluggable module comprising a frame and a function module received in the frame, the frame further defining an inside, the inside of the frame defining a through-space; wherein
    the pluggable module further comprises two tenons formed at middle portions of the inside of the frame and extending toward each other, the tenons engaging in the sockets of the main body to rotatably attach the pluggable module to the main body and electrically connect the function module with an inner circuit of the main body.

2. The portable electronic device as described in claim 1, wherein two symmetrical grooves are defined in the opposite sides of the main body.

3. The portable electronic device as described in claim 2, wherein the sockets are defined in side walls of the main body that bound the grooves respectively, and each socket comprises an electrical connector electrically connecting with the inner circuit of the main body.

4. The portable electronic device as described in claim 2, wherein each of the grooves is flared on at least one side thereof, and each of the sockets is flared at an entrance thereof.

5. The portable electronic device as described in claim 1, wherein each of the tenons comprises a cylindrical base and a pin extending from a free end of the base.

6. The portable electronic device as described in claim 5, wherein a free end of the pin is generally hemispherical.

7. The portable electronic device as described in claim 1, wherein the function module comprises a camera module.

8. The portable electronic device as described in claim 7, wherein the camera module comprises a lens and a wire.

9. The portable electronic device as described in claim 8, wherein a front side of the frame defines an opening receiving the lens.

10. The portable electronic device as described in claim 8, wherein opposite ends of the wire are connected to the lens and one of the tenons respectively.

11. The portable electronic device as described in claim 1, wherein the function module comprises a headset module.

12. The portable electronic device as described in claim 11, wherein the headset module comprises a headset, a microphone, a coiled spring and a wire.

13. The portable electronic device as described in claim 12, wherein opposite ends of the wire are connected to the headset and one of the tenons respectively.

14. The portable electronic device as described in claim 12, wherein the wire of the headset module connects the headset and the microphone.

15. The portable electronic device as described in claim 14, wherein the wire extends from the microphone, wraps around the coiled spring, and connects to one of the tenons.

16. The portable electronic device as described in claim 11, wherein the frame comprises a dustproof cover covering the headset module.

17. A portable electronic device assembly, comprising:
a main body comprising at least one socket on one edge thereof; and
a pluggable module comprising a frame defining an inner periphery and a function module received in the frame, at least one engagement section formed on a middle portion of a side of said inner periphery, said inner periphery defining a through-space; wherein
said main body is retainably and compliantly received in said inner periphery with the engagement section rotatably and retainably engaged with the socket, and the main body and the pluggable module are electrically connected to each other.

18. The assembly as claimed in claim 17, wherein electrical connection between the main body and the pluggable module is made via said socket and said engagement section.

19. The assembly as claimed in claim 17, wherein said main body includes a display shared with by said pluggable module.

20. A mobile phone assembly comprising:
a mobile phone defining an exterior contour; and
a camera module defining an interior configuration which is compliant with said contour, the interior configuration defining a through-space; wherein
the mobile phone is releasably embedded within the camera module generally in a parallel manner and is electrically connected to said camera module, the mobile phone being centrally rotatable through the camera module.

21. The mobile phone assembly as claimed in claim 20, wherein said camera module and said mobile share a same display located on the mobile phone.

22. The mobile phone assembly as claimed in claim 20, wherein both electrical connection and mechanical connection between the mobile phone and the camera are located at a same interface position therebetween.

23. The mobile phone assembly as claimed in claim 20, wherein said camera is equipped with an ear phone.

* * * * *